Nov. 24, 1959  L. A. WOHLER  2,913,899
COMPRESSION TESTER
Filed Nov. 8, 1955

INVENTOR.
LEONARD A. WOHLER
BY
W. A. Fraser
ATTY.

United States Patent Office

2,913,899
Patented Nov. 24, 1959

2,913,899

COMPRESSION TESTER

Leonard A. Wohler, Bath, Ohio

Application November 8, 1955, Serial No. 545,622

4 Claims. (Cl. 73—94)

This invention relates to a device for testing the compression of flexible foamed material.

The compression modulus of foamed materials is particularly important in connection with mattresses, seat cushions and the like, because the compression figure is a standard indication of firmness, and thus of comfort, and also acts as an index of the economy of the manufacturing process.

The foamed rubber industry generally conforms to "The Rubber Manufacturers Association Inc., Buyers' Specification—Latex Foam." This specification recites the compression test to be used in measuring cored foam material for compression modulus.

This test consists in measuring the load necessary to produce a 25% indentation in the sample, the test is commenced by bringing a flat, circular plate, having an area of 50 square inches and bearing a one pound preload, into contact with the surface of the foamed member, to determine the thickness thereof. The material is then compressed 25% of the original height at a maximum rate of 25 inches per minute, by increasing the loading on the plate, and the final total load is observed approximately 5 seconds after the plate has come to rest. This total weight is recorded as the R.M.A. compression value.

Heretofore, reliable compression measurements of such items as full size mattresses and similar objects of large area could be made only with expensive factory equipment designed to reach inwardly over the mattress from the outside edges. In addition to the expense of present factory measuring equipment, further disadvantages are inherent in the space necessary to accommodate large-scale caliper-type equipment and the attendant geartrains, springs and the like.

At times it becomes necessary to check the compression modulus under conditions of depressed temperatures; much presently known equipment for cold-testing becomes difficult to operate and the transmission of data to stations outside the test chamber unreliable and involved due to the low temperatures.

The present invention overcomes the disadvantages of the prior art by providing an inexpensive, portable device for very accurately measuring the physical characteristics of resilient material.

It is, therefore, the object of this invention to provide means for quickly and accurately measuring the thickness and the compression modulus of resilient material.

It is a further object of this invention to provide a portable device for measuring very accurately the compression modulus and thickness of foamed mattresses and other cored cushioning materials.

Another object of the invention is the provision of a lightweight compression tester for flexible, foamed, cored material.

Still another object of the invention is to provide an inexpensive compression tester for large flexible foamed objects which is substantially unaffected by extremes in temperature.

Further details of the device of the invention will be apparent from reference to the following description, drawings and claims of a preferred form of the invention, in which:

Figure 1:
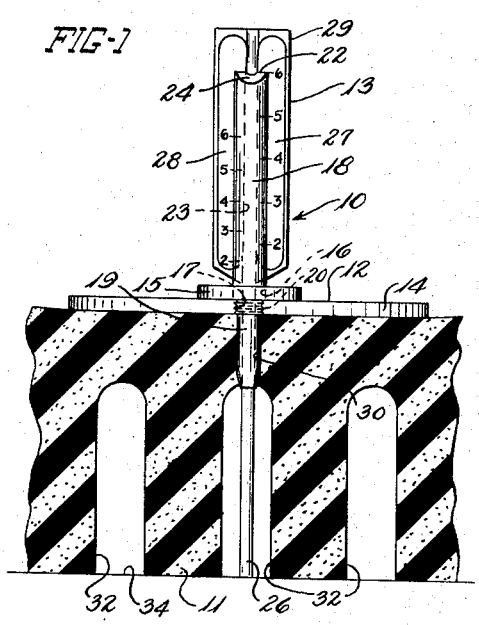
Figure 1 is a side elevation, partly in section, showing the device of the invention assembled and in unloaded position on a section of cored, foamed material.

Referring now particularly to Figure 1 of the drawings, the tester, indicated generally at 10 is shown in connection with a piece of foamed material 11, whose compression modulus is to be determined. The tester comprises two cooperating portions, a foot 12 and an indicator 13. The foot 12 comprises a 50 square inch circular plate 14 having a shoulder portion 15 and a center opening 16 threaded as at 17, and a tubular member 18 having a reduced tapered portion 19 which is threaded at 20 to engage threaded portion 17 of the plate 14. The upper portion of the tubular member 18 is provided with an axial slot 22 having a width preferably smaller than the inside diameter 23 of the tube.

The end of the upper portion of member 18 is beveled as at 24.

The foot 12 is designed to weigh exactly one pound, to give the one pound preload required by the R.M.A. procedure.

The indicator comprises a cylindrical spindle 26 adapted to be slidably supported within the tubular member 18 and carries at one end two scales 27 and 28 within a frame 29.

Preparatory to the use of the compression tester, a small slit is made through the foamed material 11 over one of the core-holes 32, as at 30. The tapered portion 19 of the foot is inserted fully into the foam material at the cut, and the lower end of the spindle 26 of the indicator brought to rest on the same surface 34 as the foam material.

Figure 2:
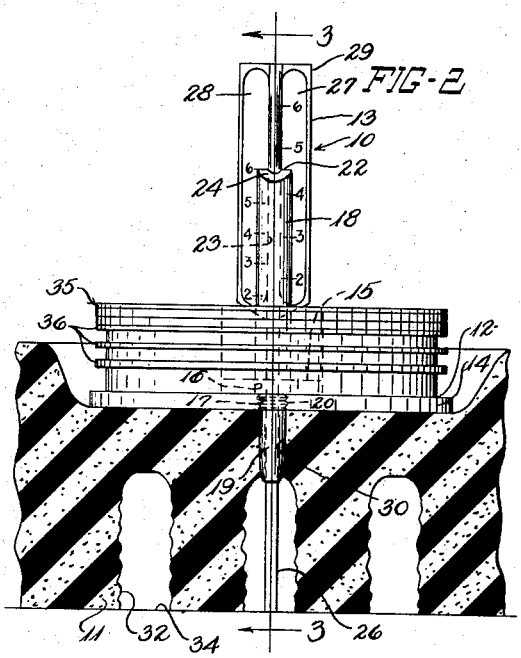
Figure 2 is a view similar to Figure 1, showing the weights in place.
Figure 3:
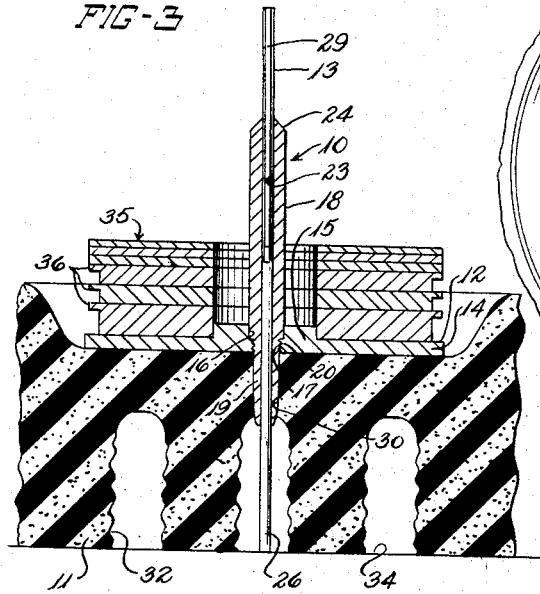
Figure 3 is a sectional view of the device of the invention taken substantially along line 3—3 of Figure 2.
Figure 4:
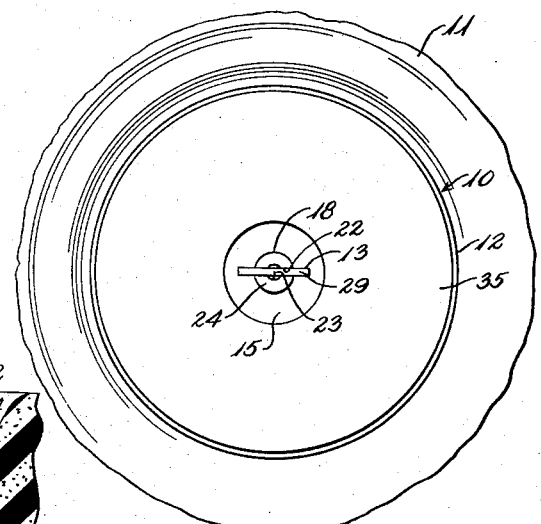
Figure 4 is a top plan view of the device.

The distance between the lower end of the spindle 26 and the bottom of the plate 14 is 6 inches, as indicated on scale 27, on which the digits are 1 inch apart. Thus, the actual thickness of the foam material is shown on scale 27 of Figure 1. Circular weights, such as 35, though heavier ones of which are provided with flanges 36 for easier handling, are stacked onto the plate 14 concentrically with the tubular member 18 compressing the foam material. The digits on scale 28 are spaced ¾ inch apart and this scale is so placed in relation to scale 27 that a reading on scale 28 equal to the original reading on scale 27 indicates a 25% displacement. With a reading on scale 28 of 6 inches, as shown in Figure 2, the foam material has been compressed 25%. The total of the weights 35 and the one pound preload corresponds to the R.M.A. compression.

The slit 30 made through the top of the foam material is so small as to be practically invisible after removal of the tester, and the slit in no way detracts from the quality of the material. If desired, it may, of course, be cemented shut.

From time to time, the R.M.A. circulates among the participating manufacturers' representative samples of foamed material to be tested on factory equipment, in accordance with the R.M.A. standard test. Some of the samples submitted were likewise checked for compression with the device of the present invention, as well as with extremely accurate and sensitive laboratory equipment. Summarized below are the resulting compression data illustrating the high degree of accuracy of the device of the invention.

| Sample | Average from 9 factory testers, 6 different mfrs., lbs. | Laboratory tester, lbs. | Portable tester of the invention, lbs. |
|---|---|---|---|
| Pillow half | 5.6 | 5.3 | 6.0 |
| Cored bulk stock | 21.7 | 22.3 | 23.0 |
| Mattress | 22.2 | 21.7 | 22.0 |

Further data illustrating the accuracy of the portable device of the invention, both in measuring thickness and compression, are shown below, where nine 4½-inch mattress sections were tested and the results compared with those obtained using laboratory equipment. Two non-consecutive blind tests were made on each sample, with the following results:

| | RMA Compression, pounds | | | Height Measurement, inches | |
|---|---|---|---|---|---|
| | Portable Tester | | Laboratory Tester | Portable Tester | Laboratory Tester |
| | 1 | 2 | | | |
| 1 | 23.5 | 23.5 | 23.9 | 4.38 | 4.36 |
| 2 | 28.0 | 28.0 | 27.9 | 4.38 | 4.34 |
| 3 | 27.0 | 26.0 | 25.7 | 4.50 | 4.49 |
| 4 | 25.0 | 25.0 | 24.6 | 4.38 | 4.35 |
| 5 | 29.5 | 28.0 | 27.8 | 4.44 | 4.41 |
| 6 | 21.0 | 20.0 | 19.9 | 4.60 | 4.58 |
| 7 | 18.5 | 18.0 | 17.6 | 4.44 | 4.45 |
| 8 | 18.5 | 18.0 | 18.2 | 4.44 | 4.41 |
| 9 | 27.5 | 27.5 | 27.0 | 4.44 | 4.41 |
| Average | 24.2 | 23.8 | 23.6 | 4.44 | 4.42 |

By leaving the weights in place on the tester, and reading the scales at timed intervals, it is possible to ascertain the rate of "draft" or "decay" of the material, which is the collapse of the material over a period of time due to stress.

In addition to testing foamed materials as described above, it will be apparent that other resilient materials, as well as foamed materials reinforced for example with springs and the like, may likewise be tested with the device of the invention.

While a preferred form of the invention has been described, it is to be understood that different types of indicators may be used, as well as a different size foot, and different weights, in conjunction with conversion factors, without departing from the spirit and scope of the present invention, the essential features of which are summarized in the appended claims.

I claim:

1. A device for measuring the compression characteristics of a slab of compressible material of substantial size and thickness as it rests on a supporting surface, said slab having a perforation extending completely through its thick dimension, said device comprising a rod of substantial length adapted to extend through said perforation to rest on said surface and having an upper portion extending upwardly beyond said slab for a substantial distance, and a graduated scale affixed to said upper portion, a flat plate of substantial area having a hub freely slidable longitudinally of said rod and comprising a portion extending completely through said perforation, said plate being supported by the portion of material adjacent said perforation, means exerting a force on said plate to compress said material a predetermined amount, said plate taking a position relative said rod as determined by the compression strength of said supporting material and the magnitude of said force, and means connected to said plate indicating on said scale the relative position of said plate on said rod.

2. The device of claim 1, in which said slab is of cored stock, and in which said perforation communicates with one of said cores.

3. The device of claim 1, in which said means exerting force on said plate comprises weights.

4. The device of claim 1, in which said means, comprises annular weights concentric with said rod.

References Cited in the file of this patent

UNITED STATES PATENTS

| 1,887,850 | Bonney et al. | Nov. 15, 1932 |
| 1,942,982 | Schneider | Jan. 9, 1934 |
| 2,654,156 | Boyer | Oct. 6, 1953 |

FOREIGN PATENTS

| 730,398 | Germany | Jan. 11, 1943 |